(12) United States Patent
Lindgren et al.

(10) Patent No.: US 7,636,434 B2
(45) Date of Patent: Dec. 22, 2009

(54) METHOD FOR UPGRADING ACCESS EQUIPMENT IN A TELECOMMUNICATIONS EXCHANGE AND AN UPGRADED TELECOMMUNICATIONS EXCHANGE

(75) Inventors: Magnus Lindgren, Sollentuna (SE); Stephen Doe, Brighton (GB); Peter Johnson, Brighton (GB)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 994 days.

(21) Appl. No.: 10/973,030

(22) Filed: Oct. 25, 2004

(65) Prior Publication Data

US 2006/0083368 A1   Apr. 20, 2006

(30) Foreign Application Priority Data

Oct. 18, 2004   (EP) .................................. 04445112

(51) Int. Cl.
*H04M 3/00* (2006.01)
(52) U.S. Cl. ....................................... 379/328; 379/325
(58) Field of Classification Search ................. 379/325, 379/328
See application file for complete search history.

(56) References Cited

OTHER PUBLICATIONS

European Search Report for EP04 44 5112 dated Mar. 24, 2005.
ATM Port Adapter and Interface Module Installation Guide, 'Online! 2001, XP002322310, Chapter 2.
Cisco BPX 8600 Series Installation and Configuration, 'Online! Aug. 2002 , XP002322311, Chapter 13.
Cisco MGX Route Processor Module Installation and Configuration Guide, 'Online! Oct. 2001, XP002322229, Chapter 3.

*Primary Examiner*—William J Deane
(74) *Attorney, Agent, or Firm*—Roger S. Burleigh

(57) ABSTRACT

When replacing an old exchange with a new one, one or more of a small unit (board or magazine) of the old exchange is removed at a time, and replaced by new equipment controlled through a different communications channel than the old equipment. This enables reuse of the existing MDF as well as the cabling from the MDF to the old exchange, which saves cost and also eliminates the need for a lot of changes to cabling documentation and support systems for handling cabling information. When upgrading as described, the new line boards can be designed to provide both voice and DSL services, or else can be made smaller or with higher capacity, so that extra space is freed up for placement of DSL equipment. The new equipment is installed in the same place as the old line board, or at least close enough to the corresponding cabling so that existing line connectors can be used.

9 Claims, 9 Drawing Sheets

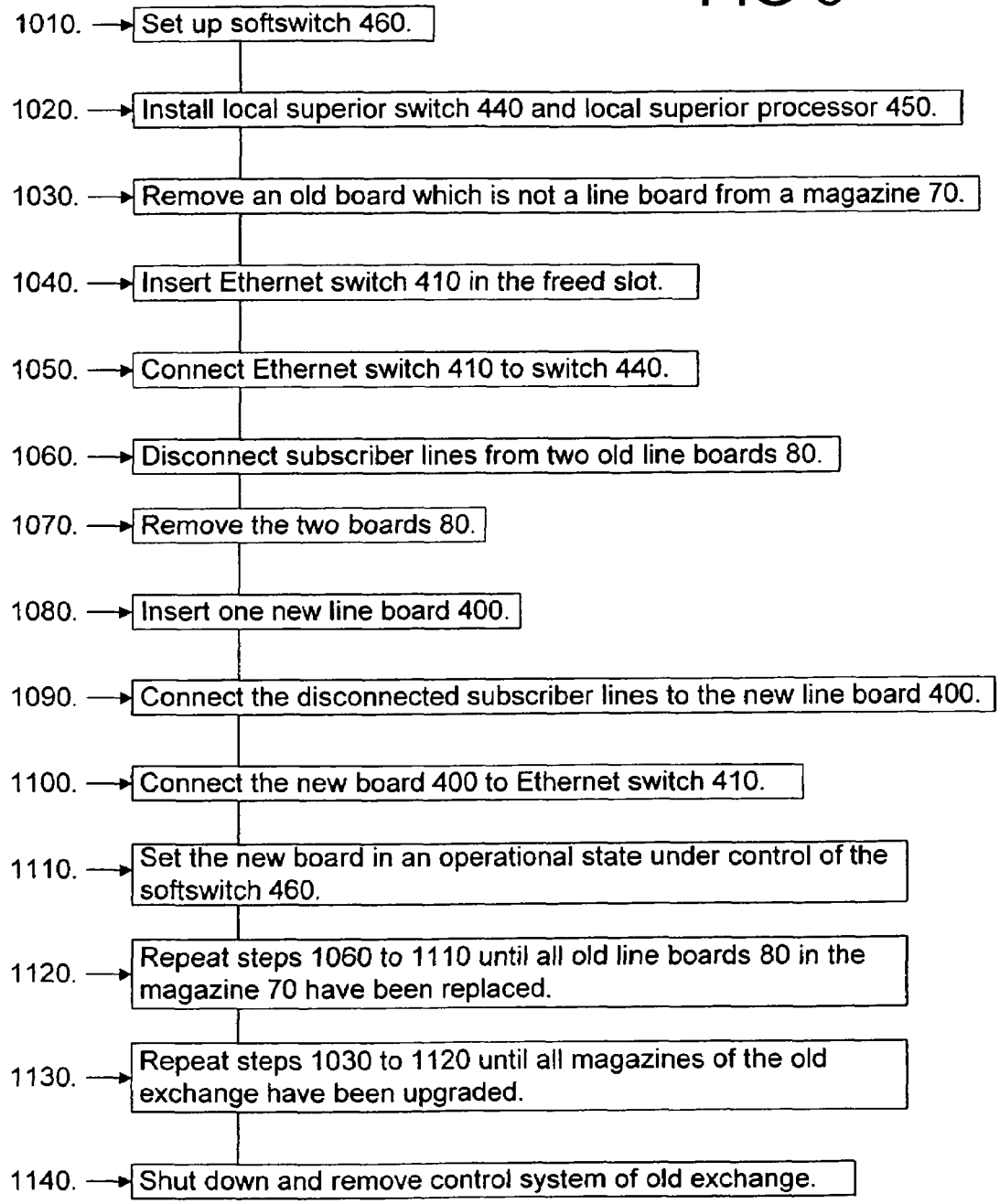

FIG 7

- 2000. → Set up Telephony Access Gateway (TAG) 500 and connect to CPU 330.
- 2010. → Remove an old board which is not a line board from a magazine 70.
- 2020. → Insert Ethernet switch 410 in the freed slot.
- 2030. → Connect Ethernet switch 410 to TAG 500.
- 2040. → Disconnect subscriber lines from two old line boards 80.
- 2050. → Remove the two boards 80.
- 2060. → Insert one new line board 400.
- 2070. → Connect the disconnected subscriber lines to the new line board 400.
- 2080. → Connect the new board 400 to Ethernet switch 410.
- 2090. → Set the new board in an operational state under control of the CPU 330 via TAG 500.
- 2100. → Repeat steps 2040 to 2090 until all old line boards 80 in the magazine 70 have been replaced.
- 2110. → Repeat steps 2010 to 2100 until all magazines of the old exchange have been upgraded.
- 2120. → Set up sofswitch 460.
- 2130. → Transfer control of TAG 500 (and associated subscriber lines) from CPU 330 to softswitch 460.
- 2140. → Shut down and remove control system of old exchange.

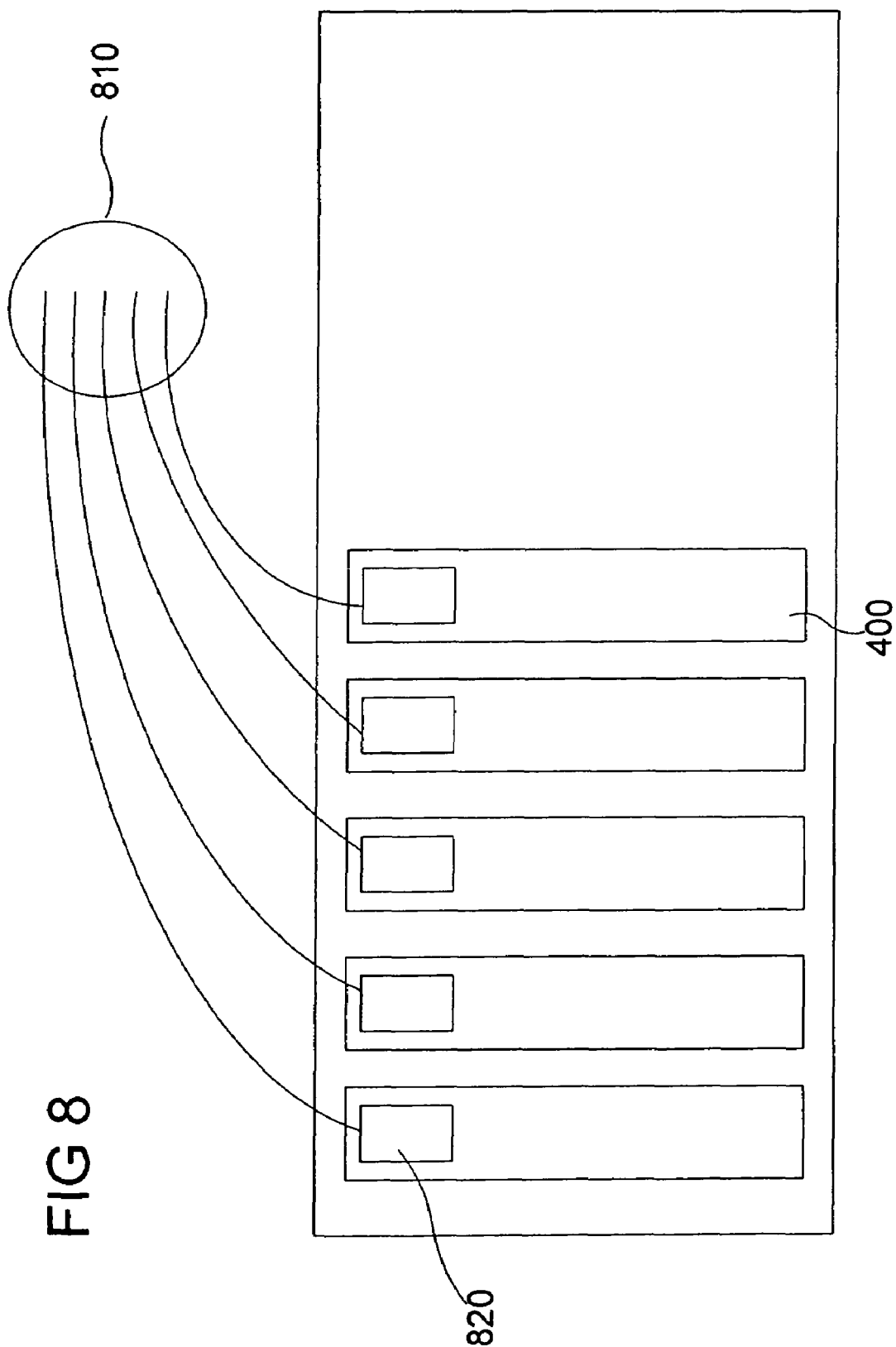

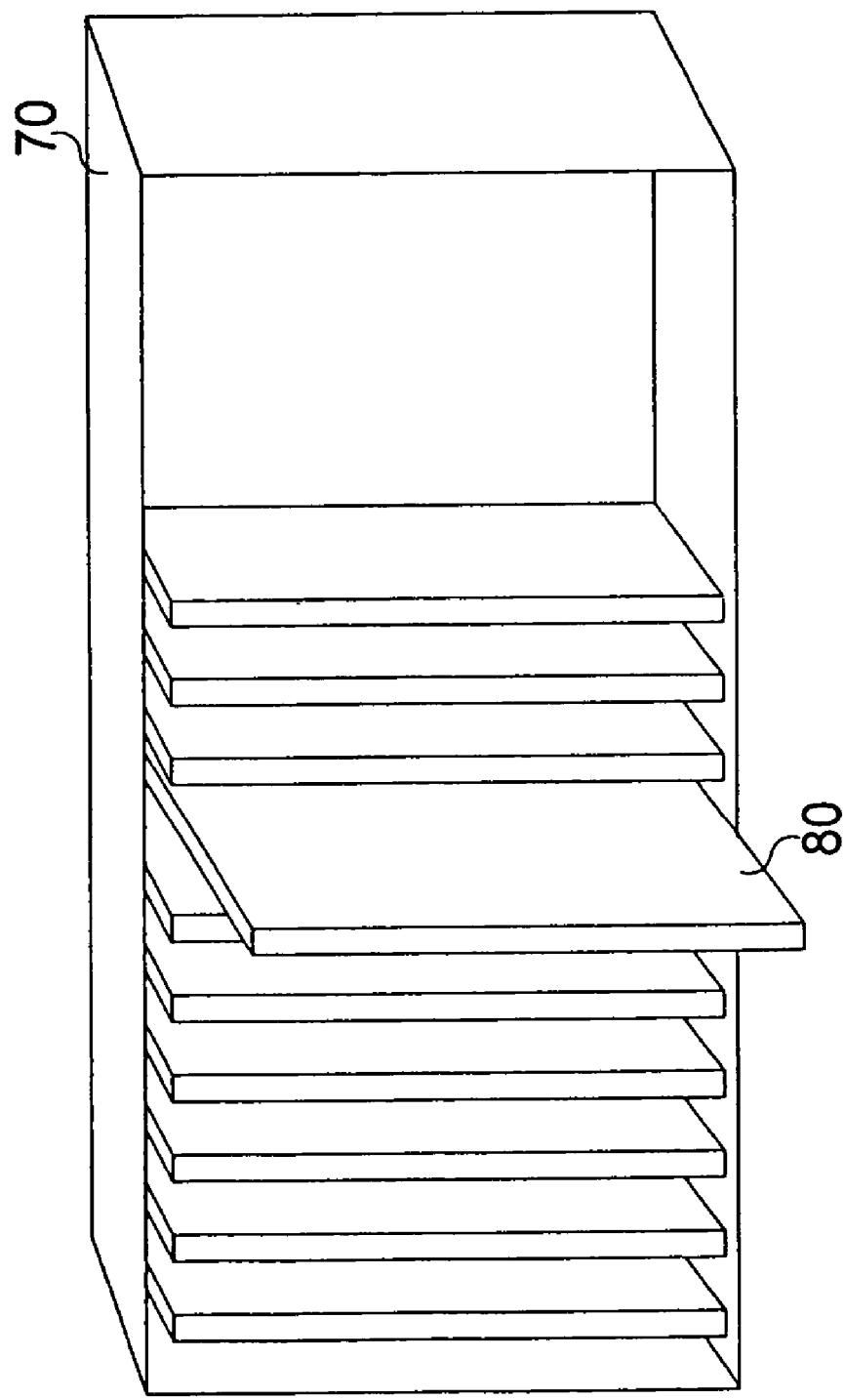

METHOD FOR UPGRADING ACCESS EQUIPMENT IN A TELECOMMUNICATIONS EXCHANGE AND AN UPGRADED TELECOMMUNICATIONS EXCHANGE

TECHNICAL FIELD OF THE INVENTION

This application claims the benefit of European patent application number 04445112.8 filed on Oct. 18, 2004, the disclosure of which is fully incorporated herein by reference.

The present invention relates to a method for upgrading equipment in a telecommunications exchange, and to a telecommunications exchange upgraded according to the method.

DESCRIPTION OF RELATED ART

When an old telecommunications exchange is to be wholly or partly replaced by a new one, the common procedure in the art is to arrange a new main distribution frame (MDF) beside the old MDF, and to set up the new exchange beside the old one. In the MDFs, lines are then disconnected from the old exchange and connected to the new exchange one or a few at a time (cut-over). This is necessary in order to keep the time of service interruption for a subscriber as low as possible.

When DSL service is to be provided to voice subscribers, this requires adding a filter and a DSL access module (DSLAM) which normally have to be housed separately from the line boards for the voice service because there is no space for extra DSL equipment in the magazine that houses the line boards. Housing the filter and DSLAM separately means that extra cabling is required to connect to the subscriber line.

In CN-1486015 of 31-Mar.-2004, a method for telephone exchange cutting an joining without changing the number is described.

SUMMARY OF THE INVENTION

The present invention concerns the problem that when replacing a telecommunications exchange with a new one, arranging a new MDF and providing extra floor space to house two exchanges at the same time according to prior practice can be very costly. Simply removing the old exchange and then setting up the new exchange in the space thus freed up would give unacceptable service interruption time for users of the exchange.

The invention also concerns the problem of reducing the cabling and space requirements associated with adding DSL service to voice subscribers An object of the present invention is thus to provide an upgraded telephone exchange and a method for upgrading a telephone exchange which does not require an extra MDF and which does not require a lot of extra floor space during the upgrade. Another object is to keep service interruption times low.

Still another object of the invention is to provide an exchange upgraded with DSL service and a method for upgrading an exchange with DSL service that does not require a lot of extra space and cabling for connecting the DSL equipment to subscriber lines.

The problems are solved in the following manner: One or more of a small unit (board or magazine) of the old exchange is removed at a time, and replaced by new equipment belonging to and controlled by the new exchange but nevertheless adapted to fit the enclosing structures of the old exchange. The new equipment is thus placed in space that was made free by removing an old board or magazine.

This enables reuse of the existing MDF as well as the cabling from the MDF to the old exchange, which saves cost and also eliminates the need for a lot of changes to cabling documentation and support systems for handling cabling information.

Extra floor space for the new exchange is not needed. Service interruption will be for a small number of subscribers at a time and for a short time.

In an alternative solution, a small unit is replaced at a time as described above, but during a transitional phase the new units are still controlled by the old exchange via a telephony access gateway. Control is then finally shifted to the new exchange.

When upgrading as described, the new line boards can be designed to provide both voice and DSL services, or else the new boards can be made smaller or with higher capacity, so that extra space is freed up for placement of DSL equipment. The new equipment is installed in the same place as the old line board, or at least close enough to the corresponding cabling so that existing line connectors can be used and no extra cabling for connecting DSL equipment to subscriber lines is needed. Thus, the advantage is gained that no extra space or cabling is needed.

BRIEF DESCRIPTION OF THE DRAWINGS

FIG. 6 shows a flow diagram for upgrading access equipment.

FIG. 7 shows a flow diagram for upgrading access equipment using a Telephony Access Gateway.

FIG. 8 shows a magazine with boards powered by new power cables connected at the front.

FIG. 9. shows a magazine.

DETAILED DESCRIPTION OF EMBODIMENTS

The old telecommunications exchange to be replaced in this embodiment may be an Ericsson AXE. It will now be described with reference to FIGS. 1, 2 and 3.

Figure 3:
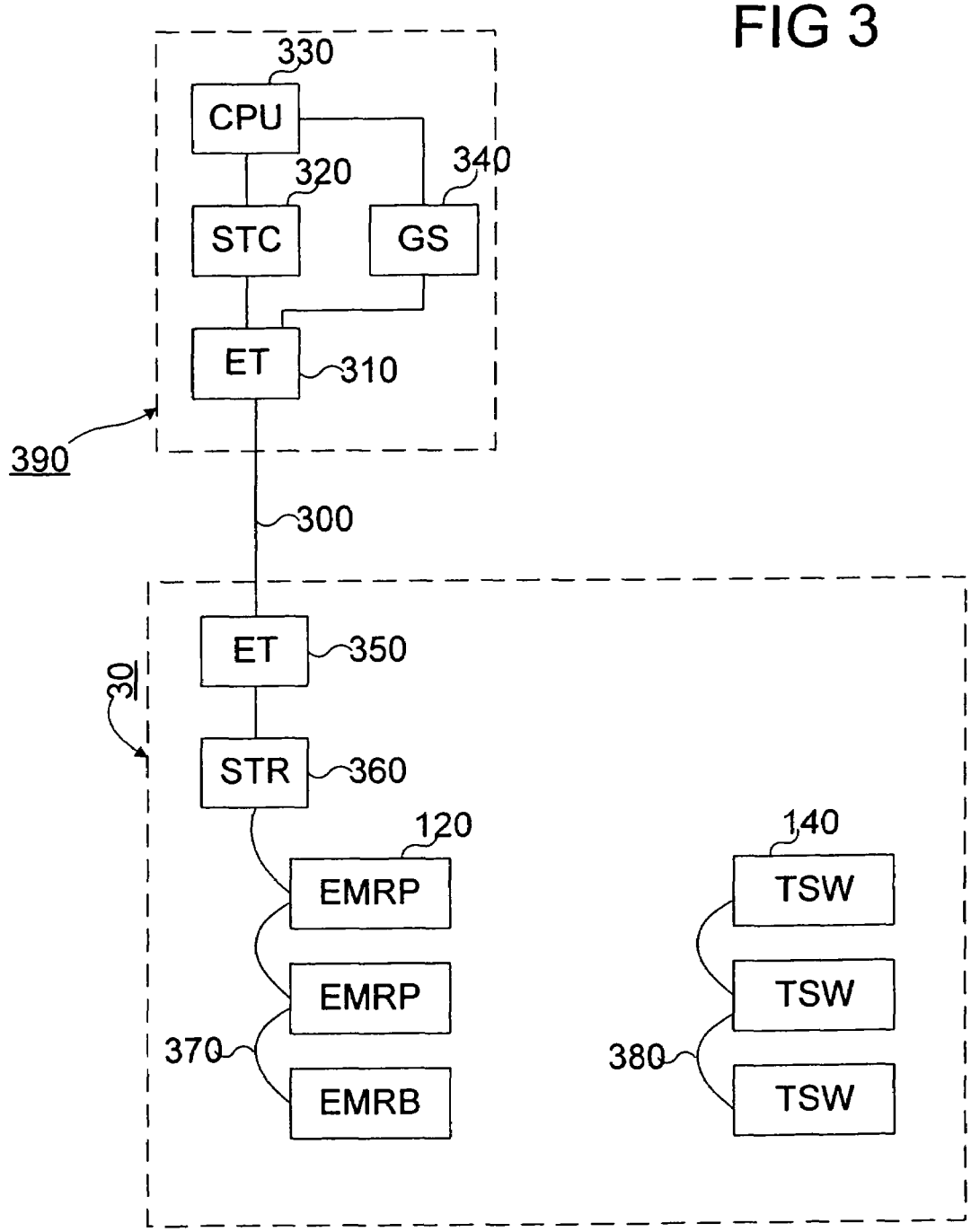
FIG. 3 shows a block schematic of the telecommunications exchange.

An AXE exchange may be distributed over several geographical sites. From a main site 390, FIG. 3, the central processor of the exchange may control equipment at a plurality of remote sites. The equipment at the remote sites is called Remote Subscriber Switch (RSS). In this embodiment, only the RSS site 30, FIGS. 1 and 3, is shown.

The RSS sites are connected to the main site via E1 links.

The exchange is also connected to other exchanges via trunk lines (not shown).

Figure 1:
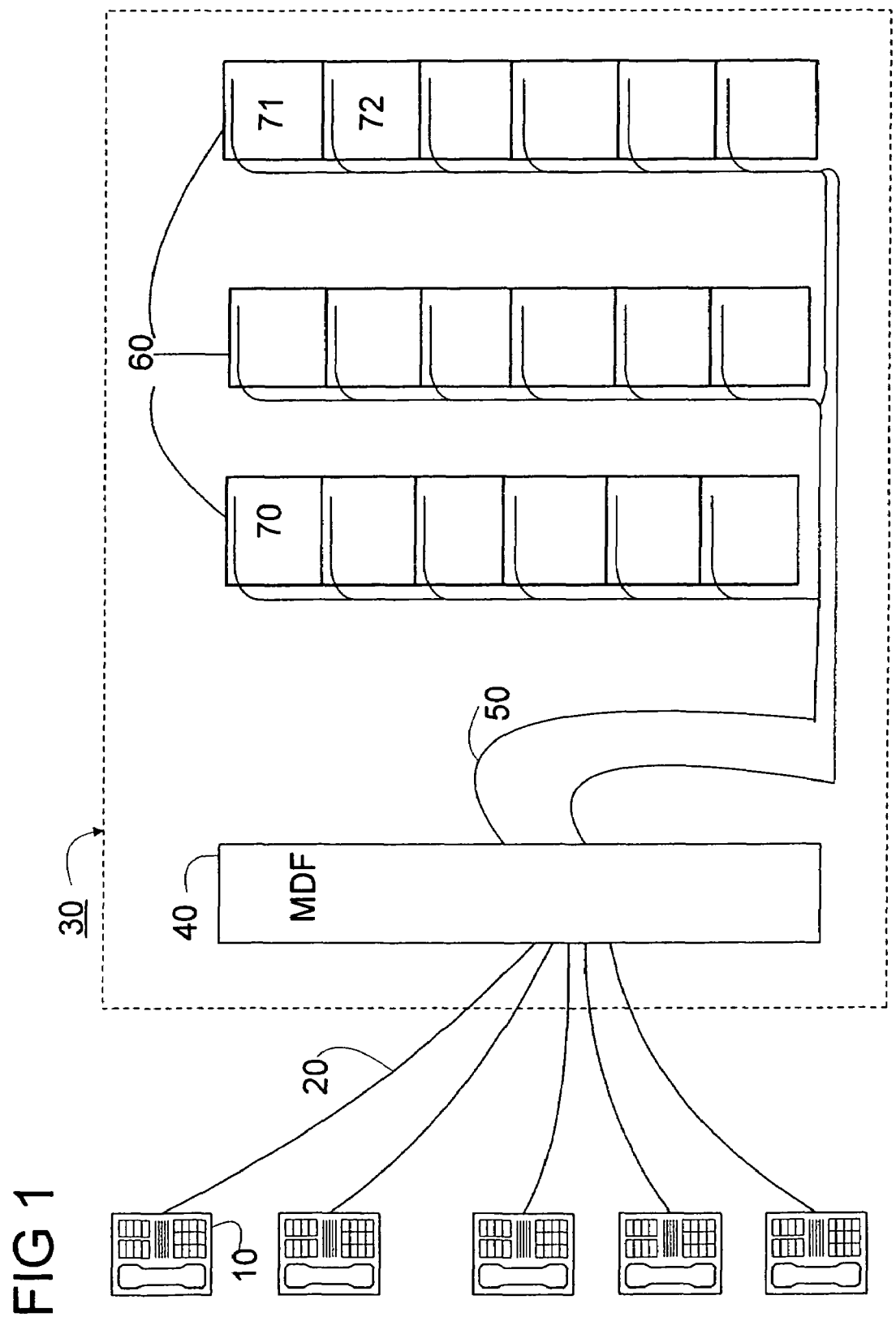
FIG. 1 shows a block schematic of a local site of a telecommunications exchange.

At the RSS site 30, FIG. 1, a plurality of telephone subscribers 10 are connected via subscriber lines 20. The subscriber lines 20 enter the site 30 at a main distribution frame (MDF) 40. From the MDF 40 the subscriber lines 20 continue via an indoor cabling 50 to cabinets 60 comprising magazines 70. The subscriber lines are connected to line boards 80 inserted into the magazines 70. A line board normally connects several subscriber lines.

The RSS uses the Ericsson BYB202 building practice. A fully equipped RSS has 3 cabinets 60, each with 6 magazines 70. Two magazines are equipped with equipment common to the whole RSS, while the remaining 16 magazines are equipped with line boards and supporting boards.

A magazine 70 is shown in FIG. 9. The magazine has board slots where boards 80 can be inserted. The inserted boards have contacts at the back which correspond to contacts at the backplane of the magazine. Through wiring in the backplane, the backplane contacts supply power and other connections to the boards.

Figure 2:
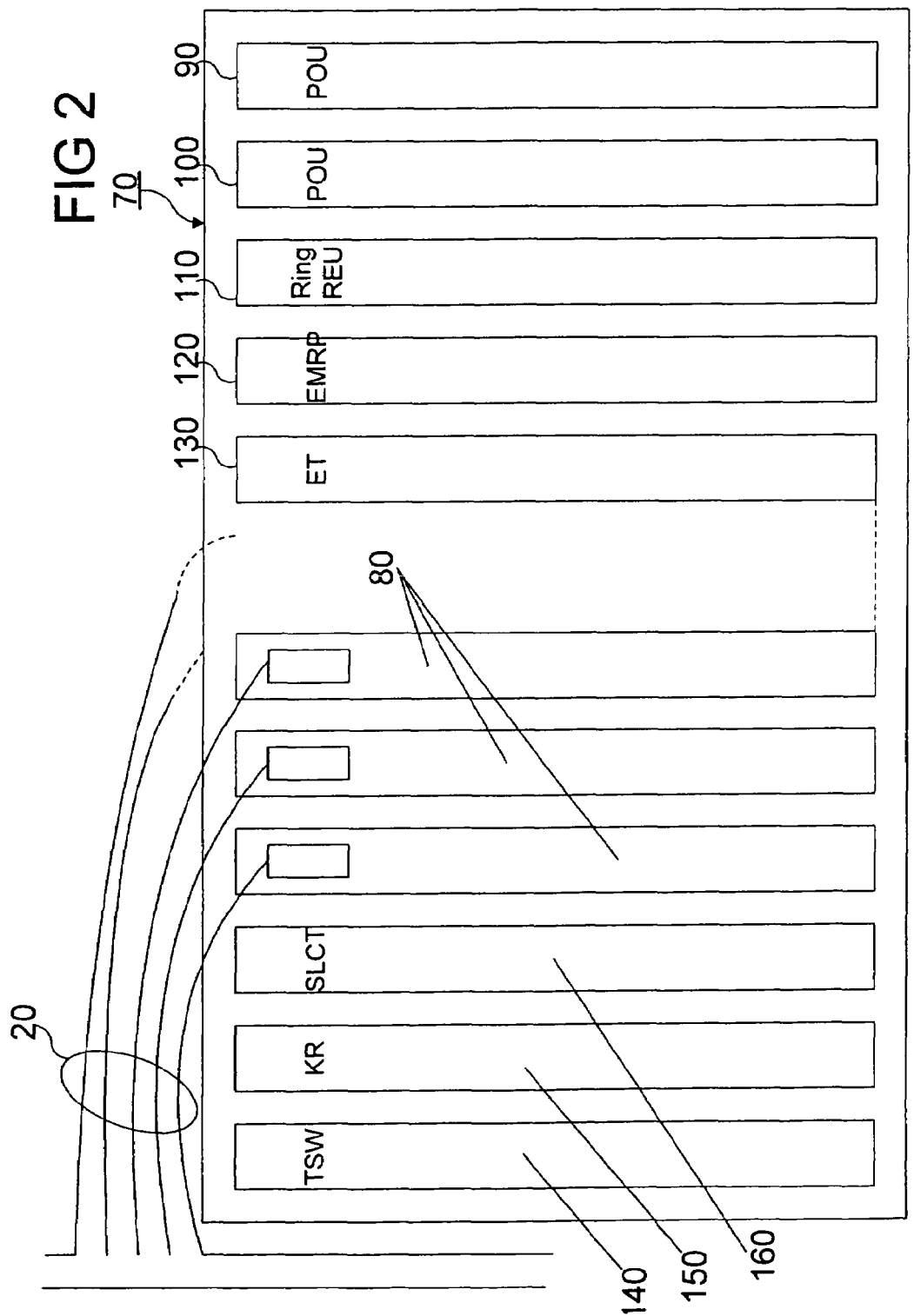
FIG. 2 shows a magazine containing circuit boards.

Referring to FIG. 2, one of the magazines 70 may be equipped as follows:

- 16 line interface boards 80, each terminating 8 subscriber lines
- EMRP, processor board 120.
- KR, DTMF receivers 150.
- TSW, switch and tone senders 140.
- SLCT, line test equipment 160.
- 0, 1 or 2 Exhange terminals 130 (ET), each handling an E1 connection to the main exchange.
- Booster power board 90 for supplying −63V, −5V and +12 V.
- Power board 100 for supplying −48 and +5V.
- Ring voltage generator 110, supplies 90 V AC The line interface boards 80 handle the normal POTS subscriber line functions as is well known. The subscriber lines enter the line interface boards through contacts at the front of the board.

The DTMF receiver board (KR) 150 is used for receiving DTMF signals when a subscriber dials a number.

Power supply boards 90, 100 and 110 supply voltages needed by the boards. The power is distributed through wiring in the backplane of the magazine.

The test board (SLCT) 160 is used for line and line circuit testing. A test bus (not shown) in the backplane gives the SLCT board 160 access to line circuits and subscriber lines 20 via the line boards 80.

The time switch board TSW 140 can set up speech channels to boards in the magazine via a speech bus in the backplane, DEVSB (not shown). The TSW board 140 also provides tones such as busy tone and dial tone.

All the TSW boards 140 of the site 30 are connected to each other via a TS bus 380, FIG. 3.

The regional processor board (EMRP) 120 handles control signalling between the boards and the controlling central processor 330 of the exchange. The EMRP 120 communicates with the other boards in the magazine via a control bus in the backplane, DEVCB (not shown).

All the EMRP boards of the site 30 are connected to each other via a bus 370, the EMRP bus.

The exchange terminals (ET) 130 each handle an E1 connection 300, FIG. 3, to the group switch 340 at the main site 390.

In magazines 71 and 72 (FIG. 1) for common equipment, a remote signalling terminal (STR) 360, FIG. 3, for communication with the central processor 330 is also connected to the EMRP bus 370. remote signalling terminal STR 360 is connected to exchange terminal (ET) 350 that handles an E1 connection 300 to the main exchange. (The particular exchange terminal 350 is one of the exchange terminals 130.)

The central processor 330, FIG. 3, of the exchange controls the line boards by sending signals through central signalling terminal (STC) 320, exchange terminal (ET) 310, over the E1 link 300, via ET 350, remote signalling terminal (STR) 360, the EMRP bus 370, the EMRPs 120 and further via the device control bus DEVCB to the line boards.

The group switch 340, FIG. 3, can set up connections to line boards 80, FIG. 2, via an ET 310 at the main site 390, an E1 link 300, an ET 130, the switch bus DEVSB in the backplane of the magazine where the ET 130 is located, the TSW 140 in that magazine, the TS bus 380, a TSW 140 in another magazine and finally via the switch bus DEVSB in that magazine to a line board 80 in that magazine.

The TS bus 380, the EMRP bus 370, the STR 360, ET 350, STC 320 and CPU 330 are normally duplicated (not shown) for redundancy reasons. Each of the magazines 71 and 72 hold one STR.

There are usually many ETs installed at the local site 30 Normally only two of them (the ETs 350) are used for signalling (one for each STR), whereas all ETs may be used for setting up connections to the group switch 340.

Figure 4:
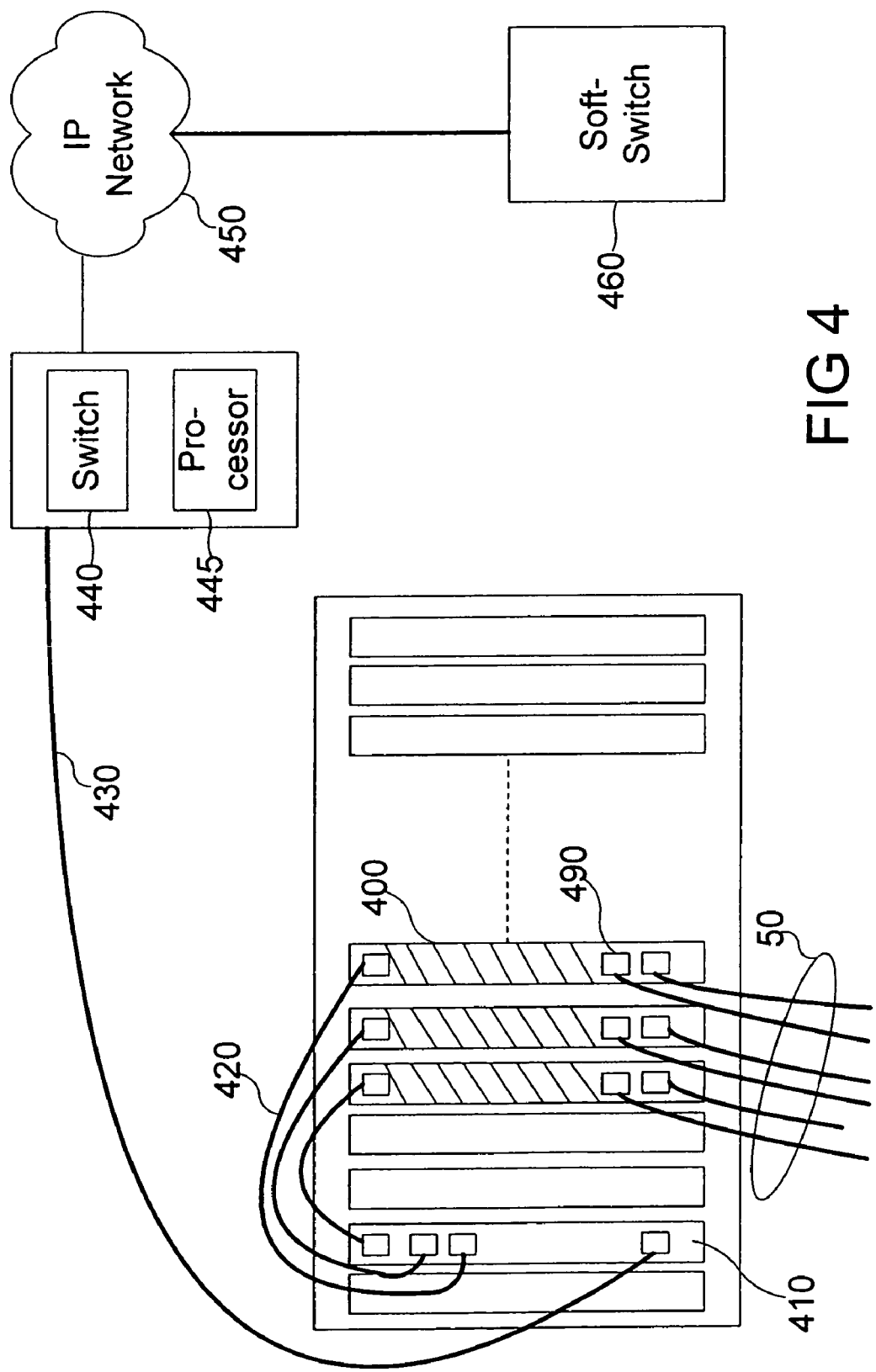
FIG. 4 shows a block schematic of a new telecommunications exchange.
Figure 5:
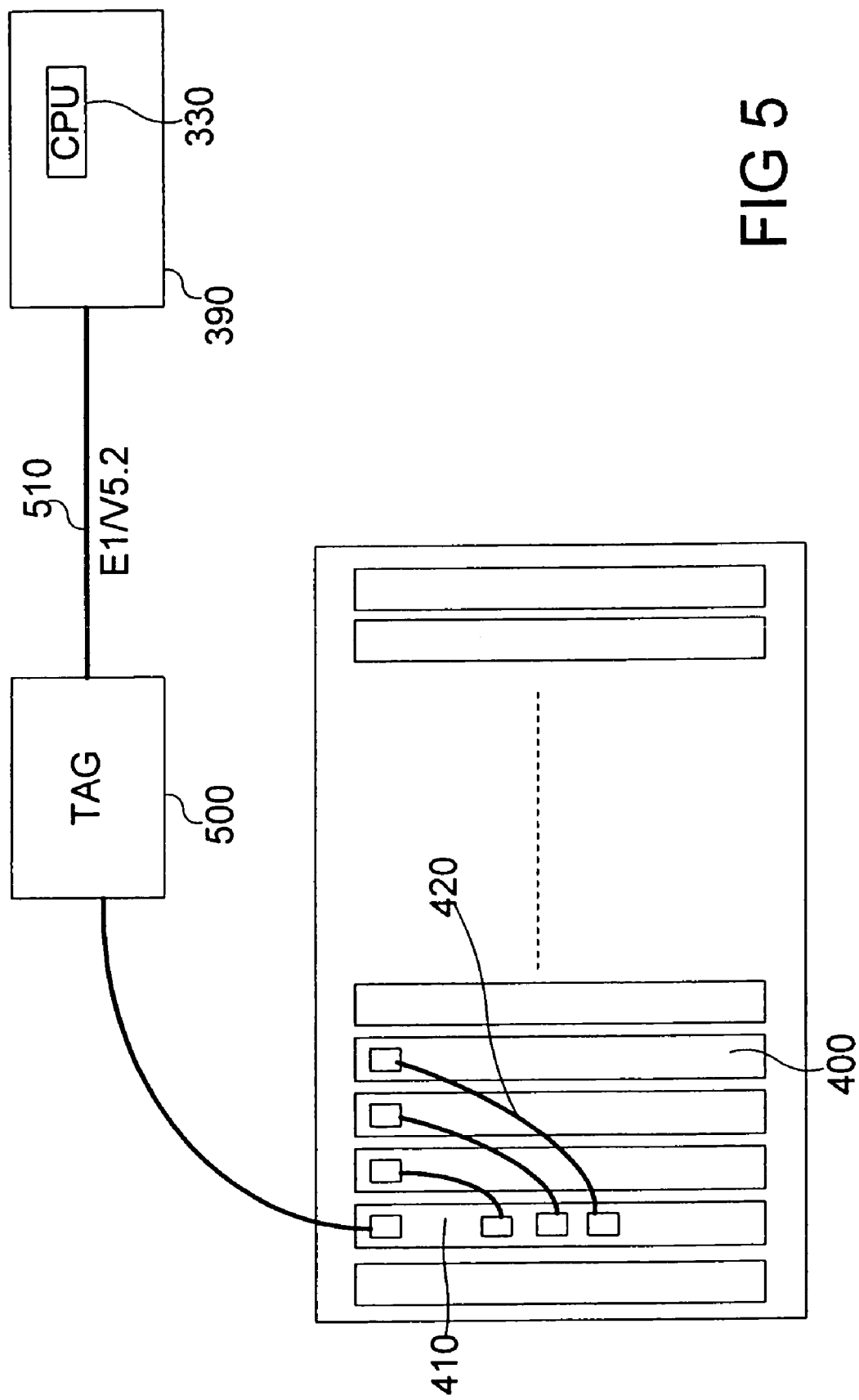
FIG. 5 shows a block schematic of upgraded equipment being controlled by the old exchange through a Telephony Access Gateway.

With reference to FIGS. 4 and 5, the new telecommunications exchange that is to replace the old one has a different structure.

Subscriber lines are connected to line interface boards 400, as in the old exchange. Those boards are not, however, connected to dedicated control buses and time switch buses.

Instead, speech information and control signalling is exchanged over a packet based communication channel 420, in this case Ethernet. Control signalling is sent using the H.248 protocol.

Speech information is thus transferred by a packet-oriented communications channel in the new exchange, as opposed to a circuit-oriented communications channel in the old exchange.

In contrast to the old line interface boards 80, FIG. 2, which are identified in the exchange by the physical position where they are located in the magazine 70, the new line interface boards 400, FIG. 4, need not necessarily be identified by the position in a magazine that they are placed in. Each new new line board has a unique identity which is fixed to the board and independent of where the board is placed or how it is connected.

A group of the line interface boards are connected to an Ethernet Switch 410. The cables run from a contact at the front of the line interface board 400 to a contact at the front of the Ethernet switch board 410.

Several such switches 410 are connected via Ethernet connections 430 to a local superior switch 440, which may be associated with a local superior processor 445 for local control of the line boards. That processor communicates using H.248 over a suitable medium such as the IP network 450 with one or more superior processors making up a softswitch 460. If the processor for local control 445 is not present, the line boards 400 communicate directly with the softswitch 460 via the Ethernet connection 420, the Ethernet switch 410, the Ethernet connection 430, the superior switch 440 and the IP network 450.

For carrying out the invention, it is only necessary that the new line interface boards 400 are able to communicate with their controlling processors (445 or 460) and transmit speech information via some other channel than the communication channels used by the old boards.

According to previous practice, when an old exchange is to be replaced by a new one, the new exchange is set up before the old exchange is removed. The line boards of the new exchange are connected to subscriber lines using new cabling to a new MDF, which is connected with new cabling to the old MDF. When the set-up of the new exchange is complete, the old exchange is taken out of service and removed (cut-over).

Now, as herein described, the old exchange is instead replaced by the new one in a successive fashion which does not require a lot of extra floor space and which does not require a lot of new cabling. In particular, the cabling from the MDF to the line boards of the old exchange can be reused as it is, and a new MDF is not needed.

This is possible if a suitable unit of the new exchange (line board or magazine) is designed to fit in the place of a corresponding unit of the old exchange, while still being designed to be controlled by the new exchange via a communications channel different from the channels used by the units of the old exchange.

In order to be able to re-use the suscriber line cabling without any modifications, the number of lines handled by the new unit should be the same as, or an integer multiple of, the number of lines handled by the old unit.

The replacement of the old exchange by the new may be wholly or partly. In general howver, the goal will be a complete replacement of the old exchange.

Before starting to replace indivual units of the old exchange, the local superior switch 440, FIG. 4, (possibly with the local superior processor 445) is installed at the site and connected to the IP network 450. One switch 440 and processor 450 can handle a large number of line boards. Hence, only one or a few switches/processors are needed which does not require a lot of new space.

The softswitch 460 is assumed to already have been set up and connected to the IP network 450. The softswitch may be located at the same site 390, FIG. 3, as the CPU of the old exchange, or at some other suitable location where it can be connected to the IP network 450, FIG. 4.

The further steps depend on what kind of unit is to be replaced at a time.

Replacement of two old line boards by one new line board will now be described, the old line boards serving 8 lines each and the new line board serving 16 lines.

The new line boards 400, FIG. 4, and the ethernet switch 410 are designed to fit into the slots of the old boards of a magazine 70, FIG. 2, and have corresponding backplane contacts (though some may not be used). They are designed to use one of the existing power buses in the backplane for their power supply. The subscriber line connectors are compatible with the old boards, so that the subscriber lines can be directly plugged into the new boards.

The new boards will in general be designed so that they need not interact with the old exchange, and their placement in the magazine 70 will in general not be detected by the control system of the old exchange.

DTMF detection, generation of tones, generation of ringing voltage and subscriber line testing functionality is integrated on the new line boards.

First, a board which is not a line board is removed to make space for the Ethernet switch 410, FIG. 4. For example the SLCT board 160, FIG. 2, may be removed. When the SLCT board is removed, subscriber line testing can no longer be made, but the absence of line testing during the time that a magazine is upgraded is a minor problem.

As an alternative an ET unit 130 may be removed. Traffic normally handled by that ET can then be handled by other ET units. As upgrade operations usually take place during periods of low traffic, there will still be sufficient traffic capacity. Either the ET unit is blocked sufficiently in advance so that all calls handled by it have terminated, or else those calls are dropped when the unit is removed and the affected callers have to initiate their calls again.

The Ethernet switch 410, FIG. 4, is inserted into the slot that was freed by the removal of an old board. The switch 410 is connected to the superior switch 440.

Next, the subcriber line connectors for two of the 8-subscriber line boards 80, FIG. 2, are disconnected. 16 lines are now out of service. The boards are replaced by one of the new 16-subscriber boards 400. The subscriber line connectors are connected to the new board.

The new board 400, FIG. 4, has two connectors 490 at the front, to receive the connectors of the subcriber line cabling 50, FIG. 4, that were previously connected to the two old line boards.

In a case where there is little or no slack in the cables, a particular placement of the boards may be necessary, to avoid a situation where the cable is to short to reach the connector at the new board 400.

If the cabling comes from the left, the new board is placed in the leftmost of the two freed slots. If the cabling comes from the right, it is placed in the rightmost slot. This makes sure that one of the cables will not be too short to reach its connector on the new board.

The new connectors are placed vertically above each other on the new line board 400 since they are too wide to be placed side by side on a single board. One of them is placed in a location corresponding to the location of the subcriber line connector on the old board. With less wide connectors, a side-by side placement would also have been possible.

The board is connected to the Ethernet switch 410 by a cable 420 that connects to connectors at the front of the boards.

The new board is now ready to be taken into service.

By way of management commands to CPU 330, FIG. 3, of the old exchange and to the softswitch 460, FIG. 4, control of the 16 subscribers is shifted from the old exchange to the new exchange. The subscribers lines are then in service again (the board is in an operational state), and calls can be placed through the new exchange.

Thus, there is now, functioning side by side in the same magazine, two generations of line boards controlled by two different exchanges but using the same power supply.

The replacement of line boards is continued until all lines of the magazine have been moved to the control of the new exchange. The other boards of the magazine (except for the power boards used by the new boards) are then no longer needed, and can be removed.

If it is desired to replace the power boards with new ones, new power boards can now be inserted in free slots and the old power boards then removed.

The process is repeated for as many magazines as desired, normally until all equipment of the old exchange has been replaced and the old exhange thus can be taken out of service and dismantled, the MDF, cabling and magazines now having become part of the new exchange.

With reference to FIG. 6, the process can take place as follows:

In a step 1010 the softswitch 460 is set up. In a step 1020 the local superior switch 440 and local superior processor 450 are installed. In a step 1030 an old board which is not a line board is removed from a magazine 70.

In a step 1040 Ethernet switch 410 is inserted in the freed slot. In a step 1050 Ethernet switch 410 is connected to switch 440. In a step 1060 subscriber lines from two old line boards 80 are disconnected. In a step 1070 the two boards 80 are removed.

In a step 1080 one new line board 400 is inserted. In a step 1090 the disconnected subscriber lines are connected to the new line board 400. In a step 1100 the new board 400 is connected to Ethernet switch 410. In a step 1110 the new board is set in an operational state under control of the softswitch 460.

In a step 1120 steps 1060 to 1110 are repeated until all old line boards 80 in the magazine 70 have been replaced. In a step 1130 steps 1030 to 1120 are repeated until all magazines of the old exchange have been upgraded.

In a step 1140 the control system of old exchange is shut down and removed.

It is possible to replace more than two boards at a time. For example, four boards could be removed and replaced by two new boards. This may be more efficient, but service interruption time will be longer. As another example, 8 boards or less could be removed at a time.

It is also possible to use new boards with a different capacity, for example the same number of lines as the old board (one-to-one replacement) or three times as many (three-to-one replacement).

In another variant, there is already to start with a free slot that can house a line board. In that case, a new board is first placed in the free slot and connected to the Ethernet switch 410, FIG. 4. The subscriber line cabling is then disconnected from a line board beside it and directly connected to the newly inserted board. The new board is then set in an operational state as decribed above. An advantage with this variant is that the new board has already been inserted before the subscriber line cabling is disconnected, and subscriber out-of-service time will thus be shorter. However, more slack in the subscriber line cabling may be required, depending on how far from the position of the old board that the new board is inserted.

If it should be desired to place new boards in positions such that the existing subscriber line cabling is too short to reach the new board, an extension cable could be used. If the number of lines served by the new board is not an integer multiple of the number of lines served by the old board, a special cable would be needed to make it possible to connect the lines previously terminated on a single board to two separate new boards. E.g. if an old board handles 8 lines and a new board handles 20 lines, every third connector handling 8 subscriber lines needs to be connectd to a splitter cable so that 4 of those lines can be connected to one new board and the other 4 to another new board.

The power supply to the new boards can be made in alternative ways. In the alternative described above, the new boards use the same voltages (or at least one of them) as the old boards, and the old power supply boards can be used during the upgrade.

In another alternative, all the new boards 400, FIG. 8, are powered by new power cables 810 and connectors 820 at the front of the boards 400, and the power buses in the backplane are not used at all. This makes the boards more independent from the old backplane (for choice of voltage for example), but requires extra cabling.

In a hybrid variant, the boards can take power from connectors at the front via temporary power cables which are used during the upgrade phase. This may be needed in the case that the new power boards need access to backplane connectors which are available only in board positions intended for power boards, and thus must be placed in the slots occupied by the old power boards.

When all the old boards have been removed (including the old power boards), new power boards are inserted that provide the voltages needed for the new boards on the old power buses. The voltages need not be the same as before the upgrade. The power inlets of the new boards that fit to the power buses in the backplane are then designed not to disturb the power feed as long as it supplies a different voltage than that for which the board is designed. For example, if the new voltage is higher than the old one, a diode arrangement can prevent the new board from pulling up the voltage of the power bus when the bus is still being used for feeding older boards with a lower voltage.

In a further variant, the new boards are designed to work over a range of voltages. When there are still old boards present, the new boards will use the same power buses and voltages (or at least one of them) as the old boards. When all the old boards have been removed, the voltages on the power buses can be changed to a level that is optimal for the new boards.

It is also possible that Ethernet switch 410, FIG. 4, and the line boards 400 do not use the same alternatives for supplying power.

If the Ethernet switch 410 is powered by a temporary cable during the replacement of line boards, the switch 410 need not first be inserted into a free board slot. Instead, the old line boards can be replaced and new line boards inserted in their place and connected to the switch 410 while the switch is still not inserted into a slot, since it is powered by the temporary cable. When all the old line boards have been replaced and the new ones taken into service, other old boards can be removed from the magazine to free up a slot where the switch 410 can be placed.

If testing functionality is not integrated into the new line boards (for example because it is not possible to provide as high a degree of test functionality with on-board testing circuitry as with separate equipment), it may be provided by a new test board, which uses the same test bus as the old SLCT board 160, FIG. 2.

If the generation of ringing voltage is not integrated into the new line boards, it can instead be provided by a common board and distributed by one of the power buses in the backplane, for example the bus that was previously used to distribute ringing voltage.

It is possible that some of the new boards need to be wider that the old boards. If that is the case, multiple slots need to be made free before the new board can be inserted.

In an alternative to the replacement of individual boards, an entire magazine is replaced at a time. The new magazine is designed to fit to the surrounding mechanical structure of the old exchange, and the line board positions of the new magazine match the positions of the old line boards in the old magazines sufficiently well that existing subscriber line connectors can be used to connect the lines to the new boards without any change in cabling.

The new magazine is first filled with all the necessary boards (line boards 400, FIG. 4, ethernet switch 410, Power supply boards). The Ethernet switch 410 is connected to the superior switch 440. Then, all connectors to the old magazine are removed, the old magazine itself is removed and the new magazine is put in place of the old one. The line and power connectors are connected to the new magazine. By way of commands to the old and the new exchange, control of the migrated subscriber lines is transferred to the new exchange. They are then back in service.

Magazine replacement is then repeated until all desired magazines have been replaced.

A drawback with replacing a whole magazine at a time is that it takes longer to replace a whole magazine, and all subscribers of the magazine are disconnected during the replacement step. Service interruption time per subscriber is therefore longer with this method.

By using a special subscriber line extension cable, service interruption time can be minimized even though an entire magazine at a time is replaced.

The extension cable at one end fits the subscriber line connectors at the end of the subscriber line cabling. At the other end it has corresponding connectors that fit to line boards.

The new magazine is prepared with all necessary boards, connected by Ethernet to the switch 440 and powered by a temporary power cable. The new line interface boards 400 are connected to one end of the subscriber line extension cable.

Then, one or a few boards at a time, the subscriber line is disconnected from an old line board and connected to the subscriber line extension cable (the lines thus being connected to a new line interface board). Control of the corresponding subscribers is then transferred to the new exchange by way of commands.

All the subscriber lines of the magazine are transferred in this way. The old magazine is then removed, and the new installed in its place. Finally, the subscriber line connectors are removed from the extension cable and connected directly to the line interface boards, and the magazine is connected to the old power cable. The temporary power cable and the subscriber line extension cable are removed.

Service interruption time with this method is only the time it takes to shift the subscriber line connector from the old line interface board to the connector at the subscriber line extension cable and to shift control of the subscriber by way of commands, plus the short time for shifting the subscriber line connector from the extension cable to the new board. This is shorter than the interruption caused when all subscribers of the magazine are disconnected simultaneously and the magazine replaced.

In the case that the new boards dissipate more heat than the old boards, it may, depending on the amount of heat dissipated, be necessary to provide forced cooling where this was not previously done. If new magazines are used, they may be provided with a built-in fan. If the old magazines are re-used, fans may be mounted in free space between the magazines, or in free board slots inside the magazines. In some cases, it may be necessary to provide a temporary mechanical support for higher located magazines when, to install the fan, a part is removed that has the function of supporting magazines above it.

When replacing magazines, in a case where magazines in higher positions are supported by the magazine to be replaced, a temporary mechanical support may also be arranged to prevent the magazines above from falling down.

As an alternative to transferring the control of subscribers from the old exchange to the new exchange as soon as their line has been moved from an old board to a new one, an intermediate step may be used.

Instead of the local switch 440, FIG. 4, and processor 445, a telephony access gatway (TAG) 500, FIG. 5, is installed at the site. The TAG 500 is connected to the main site of the old exchange via one or more E1 connections. It is connected to the magazine ethernet switches 410 with Ethernet in the same manner as local switch 440.

The TAG is designed to communicate with the CPU of the old exchange using the V5.2 protocol over the E1 connections 510, and in response to commands thus received from the old exchange control the new lineboards 400, FIG. 5, using H.248 over the Ethernet connections 430 and 420 via the magazine switch 410. The TAG 500 converts packet-based speech information from the new line boards 400 to circuit-based speech information that can be transferred on the E1 connections (and vice versa), and thus makes possible speech connections between the new line boards 400, FIG. 5, and the group switch 340, FIG. 3 of the old exchange.

Thus the TAG 500 is a gateway that makes it possible for the new line boards to exist as new devices of the old exchange. The previously mentioned transfer of control from the old exchange to the new exchange by way of commands is replaced by a transfer of subcribers from one device to another within the old exchange (also by way of commands).

When all or a desired number of subscribers of the old exhange have been transferred in this manner, the TAG 500 can be replaced by the local switch 440, FIG. 4, and thus connected to the new exchange/softswitch 460. Control can be transferred to the new exchange by way of commands.

In this manner, the access equipment of the old exchange (line boards 80, FIG. 2) can be migrated to new equipment (line boards 400, FIG. 5) separately from the migration of central control (CPU 330, FIG. 3, replaced by softswitch 460, FIG. 4) which is likely to make the migration process more reliable and less complex to manage.

With respect to FIG. 7, the replacement process involving the TAG 500 can take place as follows:

In a step 2000 the Telephony Access Gateway (TAG) 500 is set up and connected to CPU 330. In a step 2010 an old board which is not a line board is removed from a magazine 70. In a step 2020 Ethernet switch 410 is inserted in the freed slot. In a step 2030 Ethernet switch 410 is connected to TAG 500.

In a step 2040 subscriber lines from two old line boards 80 are disconnected. In a step 2050 the two boards 80 are removed. In a step 2060 one new line board 400 is inserted. In a step 2070 the disconnected subscriber lines are connected to the new line board 400. In a step 2080 the new board 400 is connected to Ethernet switch 410

In a step 2090 the new board is set in an operational state under control of the CPU 330 via TAG 500.

In a step 2100 steps 2040 to 2090 are repeated until all old line boards 80 in the magazine 70 have been replaced.

In a step 2110 steps 2010 to 2100 are repeated until all magazines of the old exchange have been upgraded.

In a step 2120 softswitch 460 is set up. In a step 2130 control of TAG 500 (and associated subscriber lines) is transferred from CPU 330 to softswitch 460

In a step 2140 the control system of the old exchange is shut down and removed.

Provisioning of DSL

In addition to traditional POTS services, it is usually desired to also provide DSL (Digital subscriber line, broadband internet access) services.

DSL service can be provided by integrating the DSL functionality on the line boards. For example, instead of replacing two old 8-line boards with one new 16-line board, each old board could be replaced by a new 8-line board providing both POTS and DSL.

However, POTS technology is considerably more mature than DSL technology, and can be expected to have a much longer lifespan before becoming obsolete. DSL technology, on the other hand, is being developed rather quickly. In this respect, it may be advantageous to have the DSL functionality separate from the POTS functionality, so that in the future DSL equipment can be replaced without replacing the POTS equipment.

Another aspect is that currently not everyone subscribes to DSL services. Therefore, if DSL functionality is integrated with POTS functionality, much of the DSL equipment may sit unused for a long time.

These aspects may be adressed by the following solution:

The old 8-line boards are replaced by new 16-line boards as described above. This leaves a free board slot beside every line board. The free board slot can be used to house a 16-line DSL board, which is connected to its neighbouring line POTS line board by a strap-plug at the front. The splitter filters needed for separating the POTS band from the DSL band are located at the POTS line board, but everything else needed for DSL is on the DSL board. Each DSL board has one or more Ethernet connectors at the front, through which ethernet cables connect them to a DSL Ethernet switch housed in a slot in the magazine that was made free when old non-lineboard equipment was removed. The Ethernet switch is connected to an IP backbone network (possibly through another local Ethernet switch). In an alternative, the same magazine ethernet switch is used for both POTS and DSL.

In another alternative, the splitter filters are also housed on the DSL board. When no DSL board is present, a plug on the front of the POTS board connects the subscriber line directly to the board circuitry. When a DSL board is present, the plug is removed and replaced by another plug which connects the subscriber line to the DSL board, and connects the filtered POTS band back to the POTS board.

In another alternative, if combined POTS/DSL lineboards are used, a single Ethernet connection per board, to a single Ethernet switch per magazine may be used. That switch is then connected further both to a TAG or softwitch and to an IP backbone as described for POTS and as described for DSL above.

In still another alternative, if in the old exchange, subscriber lines do not connect at the front of the line boards, but instead subscriber lines enter the line boards through contacts in the backplane of the magazine, the combined POTS/DSL lineboard is simply designed to receive subscriber lines through the corresponding contacts in the backplane, provided that it handles the same number of lines as the old board. If separate POTS and DSL boards are used, subscriber lines will still enter the boards through the corrsponding contacts in the backplane. (8 lines will enter the POTS board and 8 lines will enter the DSL board. Through the strap-plug at the front, the 8 lines entering the DSL board can be connected to the POTS board, the lines then being further connected as described above. If a DSL board is not needed, a dummy board can be used, that only connects the subscriber line backplane contacts from that slot to the POTS board beside it.

The invention claimed is:

1. A method for replacement of access equipment of a telecommunications exchange, the exchange comprising:
    at least one magazine for housing circuit boards;
    a plurality of circuit boards connected to subscriber lines and inserted inside at least one of the magazines and operational to handle telephone calls;
    the method comprising the steps of:
    disconnecting the subscriber lines from at least one of the circuit boards of one of the magazines;
    removing at least one of the circuit boards, from which the subscriber lines have been disconnected, from the exchange;
    adding at least one new circuit board to the exchange;
    connecting each of the new boards to a new communications channel through which it can be controlled, wherein said new communications channel is not a dedicated control bus of said magazine;
    connecting the previously disconnected subscriber lines to the new boards;
    selling the new boards in an operational state so that telephone calls can be made on the lines connected to the new boards, the board's handling of the calls being controlled through the new communications channel; and,
    repeating the method steps until a predetermined number of circuit boards have been replaced;
    wherein the new circuit boards are not controlled by the existing telecommunications exchange but instead by a processor of a new exchange.

2. The method according to claim 1, wherein one circuit board at a time is removed.

3. The method according to claim 1, wherein two circuit boards at a time are removed.

4. The method according to claim 1, wherein 8 or less circuit boards at a time are removed.

5. The method according to claim 1, wherein an entire new magazine and the new boards within it are added at a time.

6. The method according to claim 1, wherein one circuit board at a time is added.

7. The method according to claim 1, wherein the existing subscriber line cabling is used without modifications.

8. The method according to claim 1, wherein the new circuit boards are first controlled by a processor of the existing exchange via a telephony access gateway, said telephony access gateway converting between circuit-based and packet-based speech.

9. The method according to claim 1, comprising the additional steps of:
    after disconnecting the subscriber lines from at least one board, said subscriber lines are connected to at least one new circuit board in the new magazine by means of an extension cable;
    wherein the step of setting the new circuit boards in an operational state is executed before the magazine with the new boards is added; and,
    wherein the extension cable is removed before the step of connecting the subscriber line cables to the new boards.

* * * * *

UNITED STATES PATENT AND TRADEMARK OFFICE
CERTIFICATE OF CORRECTION

PATENT NO. : 7,636,434 B2
APPLICATION NO. : 10/973030
DATED : December 22, 2009
INVENTOR(S) : Lindgren et al.

It is certified that error appears in the above-identified patent and that said Letters Patent is hereby corrected as shown below:

In the drawings:
In Fig. 3, Sheet 3 of 9, for Tag "370", delete "EMRB" and insert -- EMRP --, therefor.

In Fig. 7, Sheet 7 of 9, for Tag "2100.", in Line 2, delete "replaced" and insert -- replaced. --, therefor.

In Fig. 7, Sheet 7 of 9, for Tag "2120.", in Line 1, delete "sofswitch" and insert -- softswitch --, therefor.

In Column 1, Line 49, delete "subscribers" and insert -- subscribers. --, therefor.

In Column 3, Line 15, delete "lines" and insert -- lines. --, therefor.

In Column 3, Line 20, delete "Exhange" and insert -- Exchange --, therefor.

In Column 3, Line 25, delete "AC" and insert -- AC. --, therefor.

In Column 3, Line 58, delete "remote" and insert -- Remote --, therefor.

In Column 4, Line 12, delete "30" and insert -- 30. --, therefor.

In Column 4, Line 34, after "Each" delete "new".

In Column 5, Line 10, delete "suscriber" and insert -- subscriber --, therefor.

In Column 5, Line 15, delete "howver," and insert -- however, --, therefor.

In Column 5, Line 17, delete "indivual" and insert -- individual --, therefor.

In Column 5, Line 66, delete "subcriber" and insert -- subscriber --, therefor.

In Column 6, Line 5, delete "subcriber" and insert -- subscriber --, therefor.

CERTIFICATE OF CORRECTION (continued)
U.S. Pat. No. 7,636,434 B2

In Column 6, Line 10, delete "is to" and insert -- is too --, therefor.

In Column 6, Line 20, delete "subcriber" and insert -- subscriber --, therefor.

In Column 6, Line 46, delete "exhange" and insert -- exchange --, therefor.

In Column 7, Line 21, delete "decribed" and insert -- described --, therefor.

In Column 7, Line 37, delete "connectd" and insert -- connected --, therefor.

In Column 9, Line 52, delete "gatway" and insert -- gateway --, therefor.

In Column 10, Line 5, delete "subcribers" and insert -- subscribers --, therefor.

In Column 10, Line 8, delete "exhange" and insert -- exchange --, therefor.

In Column 10, Line 30, delete "410" and insert -- 410. --, therefor.

In Column 10, Line 39, delete "460" and insert -- 460. --, therefor.

In Column 10, Line 64, delete "adressed" and insert -- addressed --, therefor.

In Column 11, Line 23, delete "softwitch" and insert -- softswitch --, therefor.

In Column 11, Line 34, delete "corrsponding" and insert -- corresponding --, therefor.

In Column 12, Line 13, in Claim 1, delete "selling" and insert -- setting --, therefor.

Signed and Sealed this

Ninth Day of March, 2010

David J. Kappos
*Director of the United States Patent and Trademark Office*